US007512628B2

(12) United States Patent
Chess et al.

(10) Patent No.: US 7,512,628 B2
(45) Date of Patent: Mar. 31, 2009

(54) SYSTEM AND METHOD FOR CONSTRUCTING A SOCIAL NETWORK FROM MULTIPLE DISPARATE, HETEROGENEOUS DATA SOURCES

(75) Inventors: Catherine Anne Chess, Ossining, NY (US); Kate Ehrlich, Newton, MA (US); Mary Elizabeth Helander, North White Plains, NY (US); Sandra Kearney, Peoria, AZ (US); Ching-Yung Lin, Forest Hills, NY (US); Sue Ann Medeiros, Hartsdale, NY (US); Katherine Penchuk, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 264 days.

(21) Appl. No.: 11/414,232

(22) Filed: May 1, 2006

(65) Prior Publication Data

US 2007/0255721 A1 Nov. 1, 2007

(51) Int. Cl.
  *G06F 7/00* (2006.01)
  *G06F 17/00* (2006.01)
  *G06Q 10/00* (2006.01)
(52) U.S. Cl. .................. 707/102; 707/104.1; 705/11
(58) Field of Classification Search ................. None
  See application file for complete search history.

(56) References Cited

U.S. PATENT DOCUMENTS

2002/0116466 A1* 8/2002 Trevithick et al. ........... 709/206
2005/0159998 A1* 7/2005 Buyukkokten et al. ........ 705/11
2005/0201290 A1* 9/2005 Vasudev et al. ............. 370/238
2005/0256756 A1* 11/2005 Lam et al. .................. 705/10
2006/0026033 A1* 2/2006 Brydon et al. ................ 705/1
2007/0136429 A1* 6/2007 Fine et al. .................. 709/206

OTHER PUBLICATIONS

Ahuja et al (2003), "Individual Centrality and Performances in Virtual R&D Groups: An Empirical Study," Management Science, Jul. 10, 2002.

* cited by examiner

*Primary Examiner*—Christian P. Chace
*Assistant Examiner*—Vei-Chung Liang
(74) *Attorney, Agent, or Firm*—McGinn IP Law Group, PLLC; Stephen C. Kaufman, Esq.

(57) ABSTRACT

A computer implemented method of constructing a social network, the method including constructing the social network from a plurality of disparate, heterogenous data sources, wherein at least one of the plurality of disparate, heterogenous data sources includes a user generated data source; identifying a plurality of nodes and linkages; determining attributes of the nodes and linkages based on a plurality of disparate, heterogenous data sources, wherein the plurality of disparate, heterogenous data sources includes a combination of the user generated data source and at least one non-user generated source, wherein the attributes include at least one of a deterministic attribute, a probabilistic attribute, and a dynamic attribute; populating a mathemetical decision-making model based on the plurality of nodes and linkages, and the determined attributes of the plurality of nodes and linkages; determining attributes of the nodes and links at a second point in time; re-populating the mathematical decision-making model based on the plurality of nodes and linkages, and the determined attributes of the plurality of nodes and linkages at the second point in time.

1 Claim, 8 Drawing Sheets

SYSTEM AND METHOD FOR CONSTRUCTING A SOCIAL NETWORK FROM MULTIPLE DISPARATE, HETEROGENEOUS DATA SOURCES

CROSS-REFERENCE TO RELATED APPLICATION

The present application is related to U.S. patent application Ser. No. 11/414,233, filed on May 1, 2006, to Chess, et al., entitled "SYSTEM AND METHOD FOR MEASURING BUSINESS TRANSFORMATION IMPACT USING SOCIAL NETWORK ANALYTICS", which is incorporated herein by reference, in its entirety.

BACKGROUND OF THE INVENTION

1. Field of the Invention

The present invention generally relates to a system and method for constructing a social network, and more particularly, the present invention relates to a system, method, and framework for constructing a social network from multiple, disparate, heterogeneous data sources, in which at least one of the data sources includes a user generated data source.

2. Description of the Related Art

For purposes of the present application, the term "social network" generally means a social structure made of nodes which are generally individuals or organizations, and edges or links between them.

For purposes of the present application, the term "social computing", or social network technology, generally means the use of social software. Social computing represents a growing trend of tools supporting social interaction and communication. For example, social computing can include email, instant messaging, blogs, wikis, auctions, web interactive communication or research, online social networking websites, etc.

A social network is a map of the relationships between individuals, indicating the ways in which they are connected through various social familiarities ranging from casual acquaintance to close familial bonds. The term was first coined in 1954 by J. A. Barnes (in: Class and Committees in a Norwegian Island Parish, "Human Relations"). Social network analysis (SNA) (also sometimes called network theory) has emerged as a key technique in modern sociology, anthropology, social psychology and organizational studies.

Research in a number of academic fields has demonstrated that social networks operate on many levels, from families up to the level of nations, and play a critical role in determining the way problems are solved, organizations are run, information is shared, and the degree to which individuals succeed in achieving their goals.

Social networking also refers to a category of Internet applications to help connect friends, business partners, or other individuals together using a variety of tools. These applications, known as online social networks are becoming increasingly popular.

Generally, social network theory views social relationships in terms of nodes and ties (or ties). Nodes are the individual actors within the networks, and linkages are the relationships between the actors.

There can be many kinds of linkages between the nodes. In its most simple form, a social network is a map of all of the relevant linkages between the nodes being studied. The network can also be used to determine the social capital of individual actors. These concepts are often displayed in a social network diagram, where nodes are the points and linkages are the lines.

The shape of the social network helps determine a network's usefulness to its individuals. Smaller, tighter networks can be less useful to their members than networks with lots of loose connections (weak ties) to individuals outside the main network. More "open" networks, with many weak ties and social connections, are more likely to introduce new ideas and opportunities to their members than closed networks with many redundant ties. In other words, a group of friends who only do things with each other already share the same knowledge and opportunities. A group of individuals with connections to other social worlds is likely to have access to a wider range of information. It is better for individual success to have connections to a variety of networks rather than many connections within a single network. Similarly, individuals can exercise influence or act as brokers within their social networks by bridging two networks that are not directly linked (called filling social holes).

The power of social network theory stems from its difference from traditional sociological studies, which assume that it is the attributes of individual actors that matter. Social network theory produces an alternate view, where the attributes of individuals are less important than their relationships and ties with other actors within the network. This approach has turned out to be useful for explaining many real-world phenomena, but leaves less room for individual agency, and the ability for individuals to influence their success, since so much of it rests within the structure of their network.

Social networks have also been used to examine how companies interact with each other, characterizing the many informal connections that link executives together, as well as associations and connections between individual employees at different companies. These networks provide ways for companies to gather information, deter competition, and even collude in setting prices or policies.

Power within organizations, for example, generally has been found to come more from the degree to which an individual within a network is at the center of many relationships than actual job title. Social networks also play a key role in hiring, in business success for firms, and in job performance.

Social networking websites (e.g., online social networks) have become widely used in virtual communities. In these communities, an initial set of founders sends out messages inviting members of their own personal networks to join the site. New members repeat the process, growing the total number of members and links in the network. Sites then offer features such as automatic address book updates, viewable profiles, the ability to form new links through "introduction services," and other forms of online social connections. Social networks can also be organized around business connections.

Blended networking is an approach to social networking that combines both offline elements (face-to-face events) and online elements. The newest social networks on the Internet are becoming more focused on niches.

The following are some terms which generally are used in describing social networks.

The term "betweenness" generally means the degree an individual lies between other individuals in the network; the extent to which a node is directly connected only to those other nodes that are not directly connected to each other; an intermediary; liaisons; bridges. Therefore, "betweenness" generally means the number of people who a person is connected to indirectly through their direct links.

The term "closeness" generally means the degree an individual is near all other individuals in a network (directly or indirectly) and reflects the ability to access information through the "grapevine" of network members. Thus, closeness is the inverse of the sum of the shortest distances between each individual and every other person in the network.

The term "degree" generally means the count of the number of linkages or ties to other actors in the network.

The term "Eigenvector Centrality" generally is a measure of the importance of a node in a network. It generally assigns relative scores to all nodes in the network based on the principle that connections to nodes having a high score contribute more to the score of the node in question.

The term "clustering coefficient" generally means a measure of the likelihood that two associates of a node are associates themselves. A higher clustering coefficient indicates a greater 'cliquishness'.

The term "cohesion" generally means the degree to which actors are connected directly to each other by cohesive bonds. Groups generally are identified as 'cliques' if every actor is directly tied to every other actor, or 'social circles' if there is less stringency of direct contact.

The term "individual-level density" generally means the degree to which a respondents linkages know one another, or the proportion of linkages among an individual's nominees. The term "network or global-level density" is the proportion of linkages in a network relative to the total number possible (sparse versus dense networks).

The term "group degree centralization" generally means a measure of group dispersion or how network links focus on a specific node or nodes.

The term "radiality" generally means the degree an individual's network reaches out into the network and provides novel information and influence The term "reach" generally means the degree any member of a network can reach other members of the network.

The term "structural equivalence" generally means the extent to which actors have a common set of linkages to other actors in the system. The actors don't need to have any linkages to each other to be structurally equivalent.

The term "static holes" generally means structural holes that can be strategically filled by connecting one or more links to link together other points. Linked to ideas of social capital: if you link to two people who are not linked you can control their communication.

Conventional methods generally rely on only one, or only homogeneous sources of data to construct the social network. The problem is that the analysis performed based on the derived social network is limited.

Furthermore, the conventional methods do not consider more than one source of user generated information, nor do they consider user generated sources in combination with non-user generated sources.

Conventional methods generally describe construction of social networks with multiple kinds of edges, reflecting different kinds of relationships. However, the conventional methods use only one data source used to construct the edges.

Other conventional methods use SNA to build knowledge maps, which are constructs within the area of knowledge management. Such conventional methods borrow from the standard practice of SNA (and other disciplines), but do not suggest or extend construction methods, according to the exemplary aspects of the present invention.

SUMMARY OF THE INVENTION

In view of the foregoing and other exemplary problems, drawbacks, and disadvantages of the related art methods and structures, an exemplary feature of the present invention is to provide a system, method, and framework for constructing a social network from multiple, disparate, and heterogeneous data sources, wherein at least one data source includes a user generated data source.

The present inventors have recognized that conventional social network analysis can be improved significantly by providing a richness of data derived from multiple, disparate, heterogeneous data sources, wherein at least one data source includes a user generated data source.

The present invention recognizes that conventional social network construction may result in limited analysis because of limited ability to triangulate and verify information, and to eliminate inconsistencies.

For purposes of the present application, the term "user" means the same entities that become actors/nodes in the social network. The term "heterogeneous" generally means that at least one attribute is not in common. The term "disparate" generally means that all attributes are not in common.

The problem with the conventional approaches is that user generated data is subjective by nature, and construction based on the multiple, heterogeneous sources allows for triangulation and provides a means for consistency check. That is, constructed social networks are therefore more reliable representations. The increased accuracy allows for improved analysis and greater potential for diagnosis and prescriptive use.

Also, the present invention can perform social network optimization based on the rich data obtained from such multiple, disparate, heterogeneous data sources.

For example, in one exemplary aspect of the invention, a computer implemented method of constructing a social network, includes constructing the social network from a plurality of disparate, heterogeneous data sources.

In another exemplary aspect of the invention, a system for constructing a social network, includes a constructing unit that constructs said social network from a plurality of disparate, heterogeneous data sources.

In another exemplary aspect of the invention, a system for constructing a social network, includes means for identifying a plurality of nodes and linkages of the social network, and means for determining attributes of the nodes and linkages based on a plurality of disparate, heterogeneous data sources.

In another exemplary aspect of the invention, a method of deploying computing infrastructure in which recordable, computer-readable code is integrated into a computing system, and combines with the computing system to perform a method of constructing a social network from a plurality of disparate, heterogeneous data sources.

In another exemplary aspect of the invention, a signal-bearing medium tangibly embodying a program of recordable, machine-readable instructions executable by a digital processing apparatus to perform and method of constructing a social network from a plurality of disparate, heterogeneous data sources.

BRIEF DESCRIPTION OF THE DRAWINGS

The foregoing and other exemplary purposes, aspects and advantages will be better understood from the following detailed description of an exemplary embodiment of the invention with reference to the drawings, in which.

DETAILED DESCRIPTION OF EXEMPLARY EMBODIMENTS OF THE INVENTION

Figure 1:
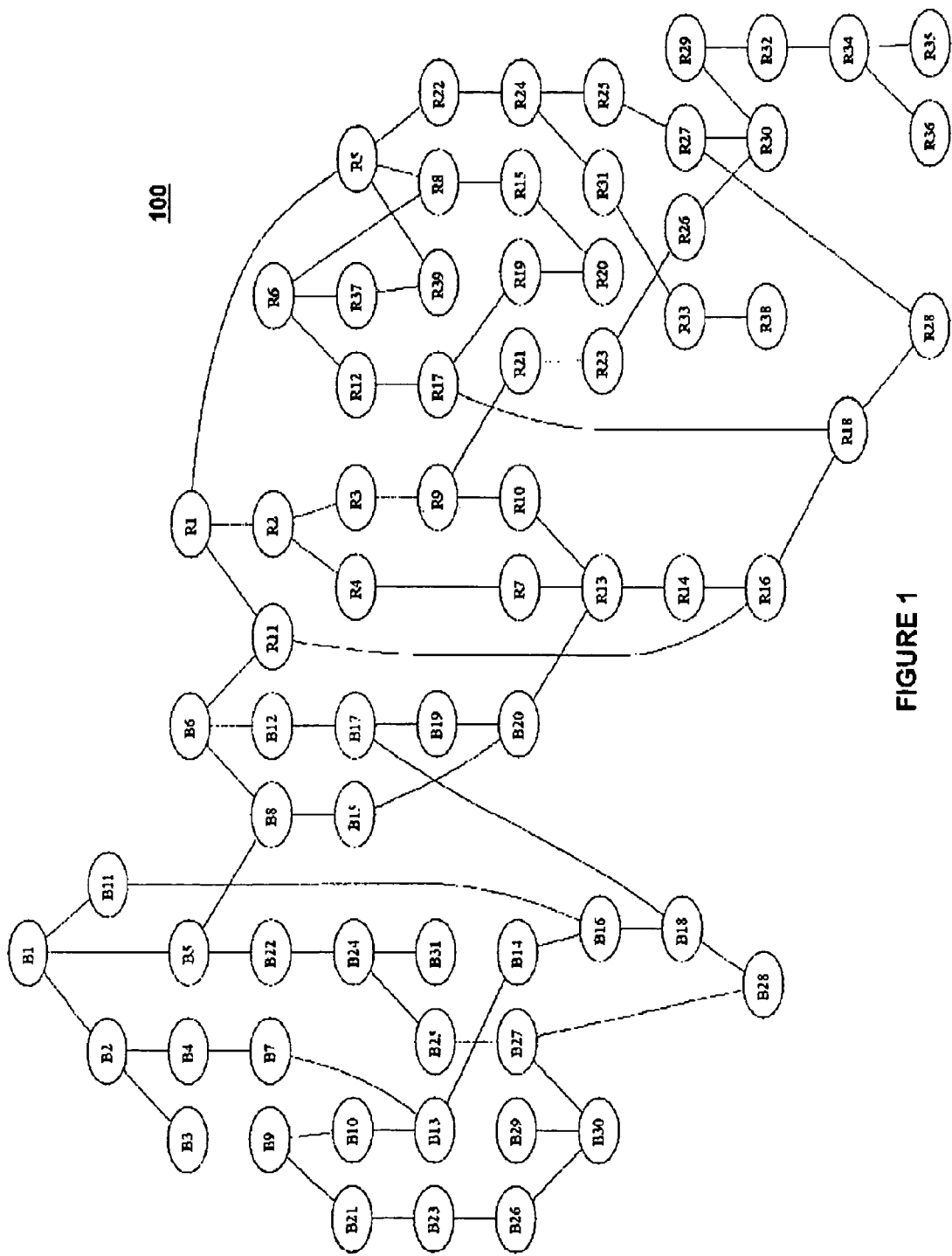
FIG. 1 illustrates a social network 100 according to an exemplary, non-limiting embodiment of the present invention.

Referring now to the drawings, and more particularly to FIGS. 1-9, there are shown exemplary embodiments of the method and structures according to the present invention.

The present invention generally relates to a system and method for performing social network analysis (SNA), which has emerged as a key technique in modern sociology, anthropology, social psychology and organizational studies. SNA is also emerging as a consulting methodology for understanding business processes, communication patterns within and between businesses, communities of practice, and customer markets.

As mentioned above, a social network generally means a social structure made of nodes and edges or links between them. The nodes of the social network generally identify individuals or organizations. The links of the social network generally demonstrate relationships between pairs of nodes (e.g., between the individuals and/or organizations). An edge generally means an undirected link between two nodes, and an arc represents a directed link between two nodes. For example, node A goes to node B for information.

As mentioned above, the term "social computing", or social networking technology, generally means the use of social software. Social computing represents a growing trend of tools supporting social interaction and communication. For example, social computing can include email, instant messaging, blogs, wikis, auctions, web interactive communication or research, online social networking websites, etc.

The present invention relates to a method and system for constructing a social network from multiple, disparate, heterogeneous data sources.

The present invention also exemplarily provides a method and system for performing optimization based on social network analysis to perform business decisions and allocate resources based on the social network which is constructed from multiple, disparate, heterogeneous data sources.

FIG. 1 exemplarily illustrates a social network, according to the present invention, in which optimal allocation of limited resources can be performed to improve the connectivity between two groups.

The present invention has recognized that nodes and links/edges can have various attributes. These attributes can be used to populate data sources for constructing the social network. For example, the present invention provides a method and system for constructing a social network from multiple, disparate, and heterogeneous data sources.

The present invention can provide automated (e.g., scrapping, parsing) collection of data combined with traditional survey methods for social network construction.

Thus, the present invention has an important feature in that a richness of attributes can be provided. The conventional systems and methods cannot, and do not, provide such attribute richness, or for that matter, provide decision making based on such rich attributes.

According to the present invention, the rich attributes of the nodes and/or links/edges can be identified and used to populate multiple, disparate, and heterogeneous data sources for constructing the social network. Such attributes of the nodes and/or links/edges can include, for example, deterministic attributes, probabilistic attributes, dynamic characterization, etc.

For example, the present invention can capture dynamic social network aspects for the network components (e.g., the nodes and/or links/edges).

According to the present invention, the attributes can be related to the people or organizations themselves (i.e., nodes) or related to the linkages among the nodes.

Examples of attributes (or metrics) associated with nodes can include, among others, title, department, number years with company, resume, telephone number, e-mail address, physical office location, education, experience, past projects, gender, languages spoken, knowledge of computer programming languages, etc.

Examples of attributes (or metrics) associated with linkages can include, among others, how people collaborate, patterns of communication, frequency of communication, information sharing, decision-making and innovation within a particular organization or group, or between particular nodes, how the nodes know each other (e.g., through work, soccer, co-authoring a patent, co-authoring a paper, etc.), brokering between nodes, cliques formed among the nodes, path lengths of communication between nodes, density, etc.

An "edge" generally means a pairing of two nodes. An edge can be a uni- or bi-directional link between two nodes. Each edge also can have attributes, such as how person A knows person B, or that persons A and B know each other because they play soccer together, work in the same department, co-authored a paper together, co-inventors on a patent, etc. Other examples of edge attributes include strength of relationship, frequency of communication, probability of communicating in the future, level of trust of person A by person B, etc.

An important aspect of the present invention is providing a richness of data for populating the social network. To provide such rich data, the exemplary method and system of the present invention can construct a social network from multiple, disparate, and heterogeneous data sources.

Figure 2:
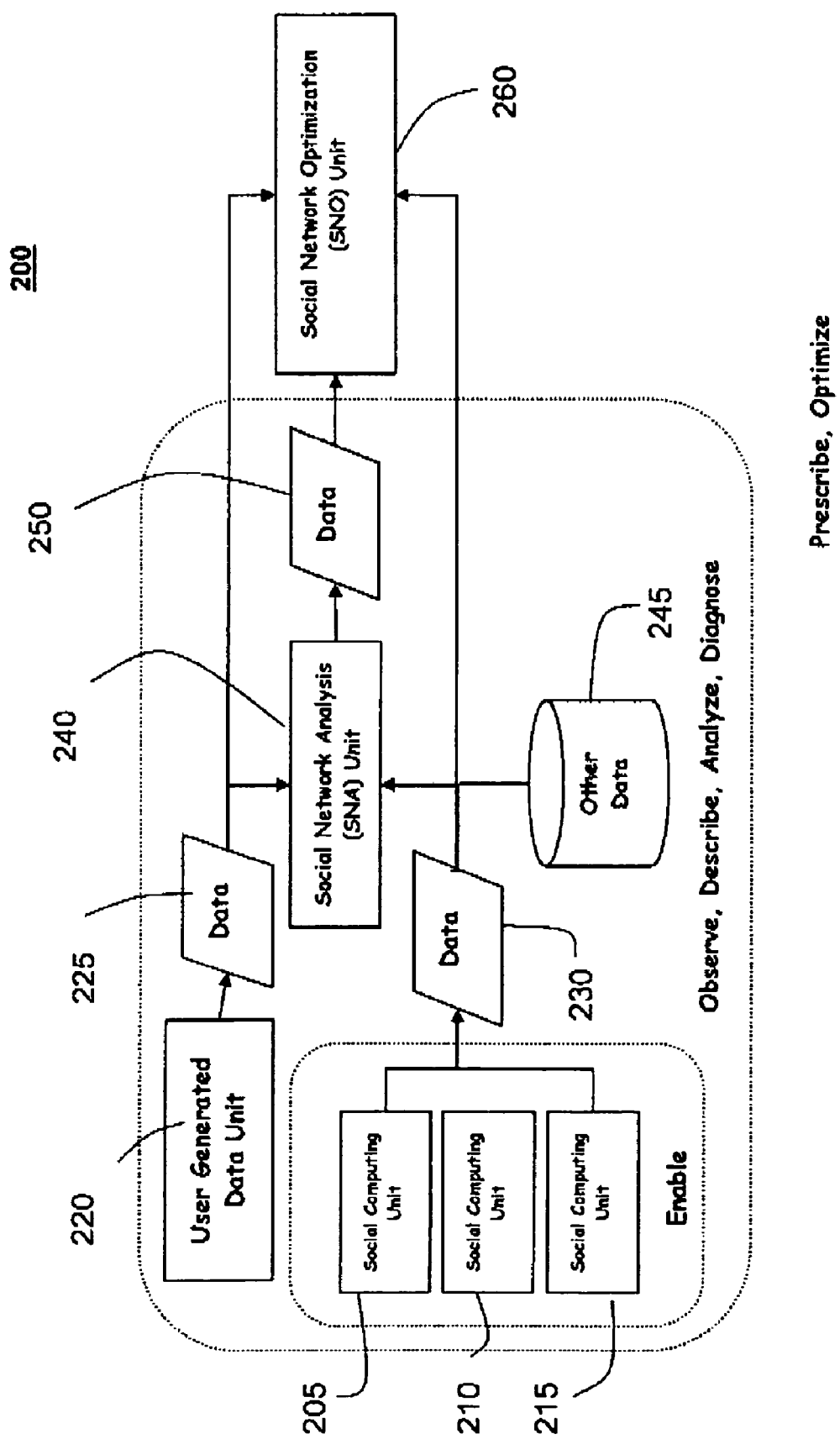
FIG. 2 illustrates a system 200 according to another exemplary, non-limiting embodiment of the present invention.

With reference to FIG. 2, an exemplary system according to the present invention can include a social network analysis unit 240, which receives input from a plurality of disparate, heterogeneous data sources (e.g., 225, 230, 245).

The present invention can provide automated collection (e.g., scrapping, parsing, etc.) combined with traditional user-generated (e.g., survey) methods for social network construction.

For example, with reference again to FIG. 2, data 230 can be derived (or automatically collected) from social computing units 205, 210, and 215). The social computing units 205, 210, and 215, can include, for example, email, instant messaging, blogs, wikis, auctions, web interactive communication or research, online social networking websites, etc.

On the other hand, data 225 can be derived from user generated data 220 (e.g., traditional surveys, a plurality of user generated data sources, etc.). In one aspect of the invention, the data sources include at least one user generated data source (e.g., a survey, etc.) and at least one non-user generated data source.

An exemplary method according to the present invention is described with reference to FIG. 3.

For example, according to the exemplary aspects of the present invention, a survey can be administered to a group of participants of an event (e.g., for mixing people of different backgrounds and organizations) prior to the event to obtain a plurality of user generated data. Another survey can be administered after the event, and/or after a predetermined period of time has elapsed from the time of the event.

Since some of the participants will have interacted at the event, and possibly gotten to know each other during the event, connections may have been made. As another example, some participants may have obtained research ideas from participants who deal with clients, while others may derive client proposal ideas from research participants.

The present invention can perform social network analysis of the attendees based on survey information before the event, survey information after the event, and time delayed follow up survey information, which may include whether the participants are or have now talked or worked together. Also, secondary interactions/connections can be taken into account, such as participants connecting with others through other participants, or by word of mouth/e-mail, etc.

The ordinarily skilled artisan would know and understand that other data 245 also can be derived or extracted from a variety of other sources, such as directories, etc.

The present invention can construct a social network from a plurality of disparate, heterogeneous data sources, such as survey data (e.g., a plurality of user generated data sources), social computing data, and combinations thereof. Hence, the present invention can provide attribute richness, including deterministic and probabilistic attributes, as well as capturing dynamic social network aspects (i.e., dynamic characterization of network components (e.g., nodes and linkages)) by extracting or obtaining data from disparate, heterogeneous data sources.

The aforementioned exemplary linkages between people can provide valuable metrics and can provide disparate, heterogeneous data to be used to compare the before and after states of the nodes and linkages of the social network and make business decisions.

Figure 3:
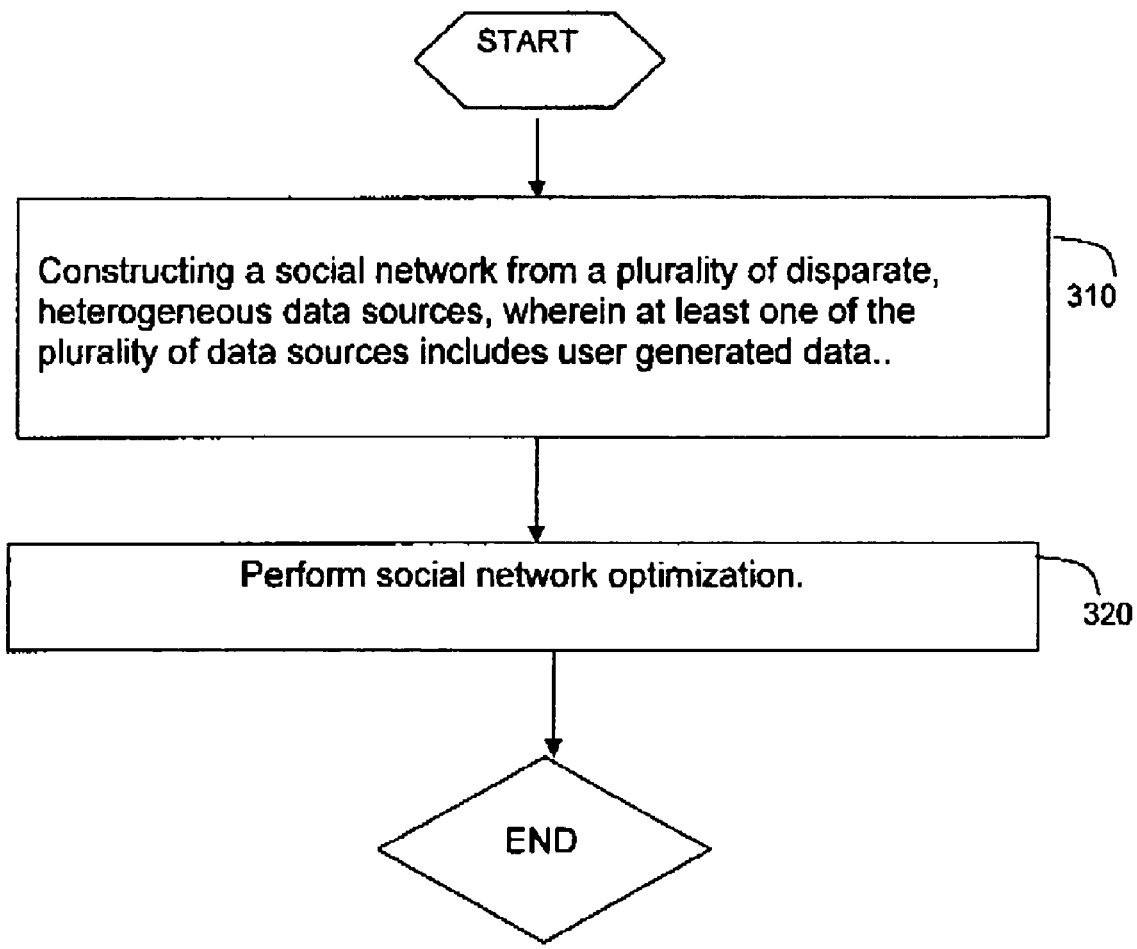
FIG. 3 illustrates a method 300 according to an exemplary aspect of the invention.

With reference to the exemplary method illustrated in FIG. 3, a computer implemented method of constructing a social network includes, for example, constructing the social network from a plurality of disparate, heterogeneous data sources (e.g., see 310).

Figure 4:
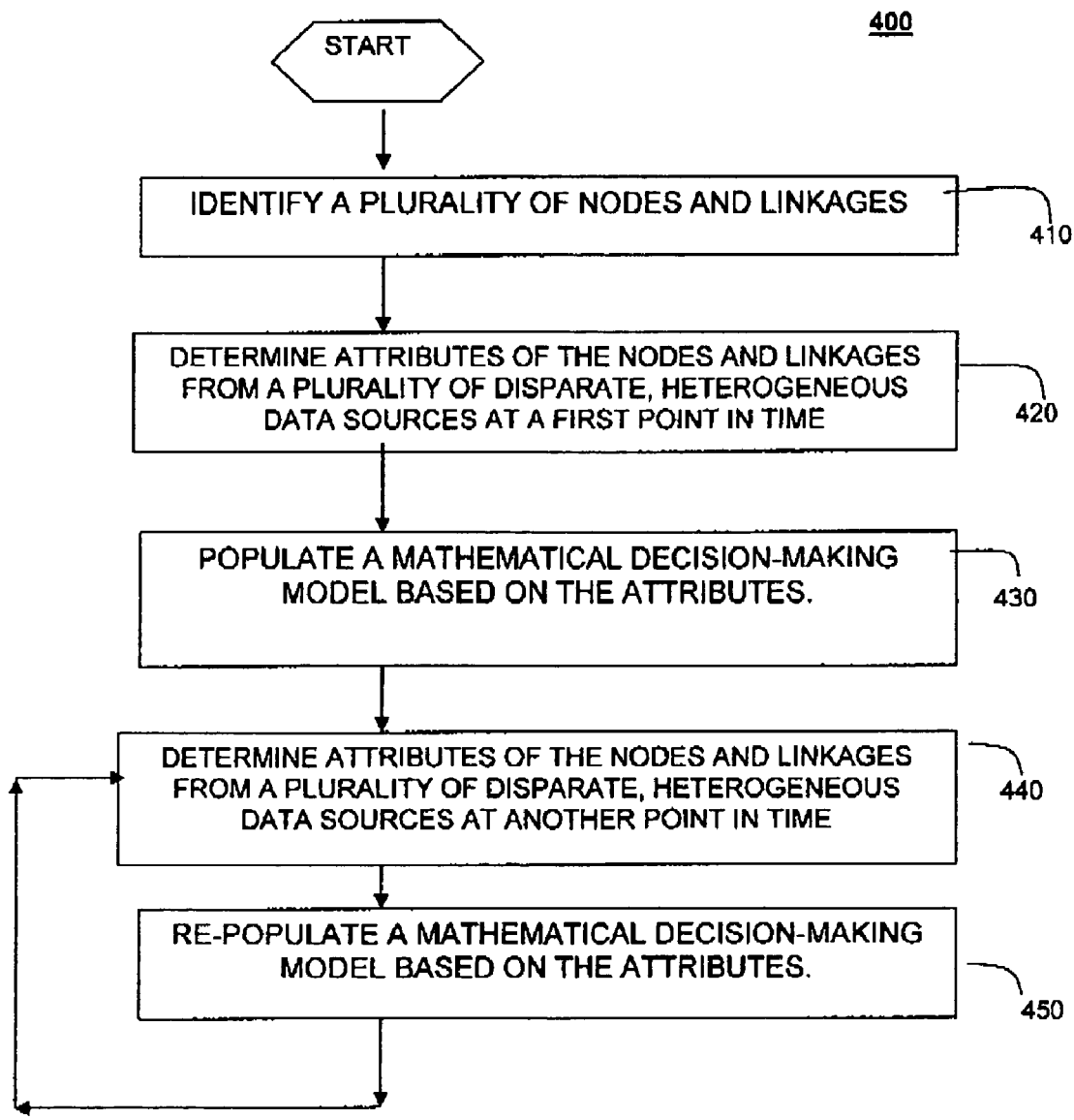
FIG. 4 illustrates a method 400 according to an exemplary aspect of the invention.

With reference to the exemplary method illustrated in FIG. 4, a computer implemented method of constructing the social network includes, for example, identifying a plurality of nodes and linkages (e.g., see 410) and determining attributes of the nodes and linkages based on the plurality of disparate, heterogeneous data sources (e.g., see 420). The attributes can include, for example, at least one of a deterministic attribute, a probabilistic attribute, and a dynamic attribute.

With reference again to FIG. 3, the present invention also can provide social network optimization to the analytics provided by the social network analysis constructed from the plurality of disparate, heterogeneous data sources (e.g., see 320). In one aspect of the invention, the data sources include at least one user generated data source (e.g., a survey, etc.) and at least one non-user generated data source. Thus, social network optimization can be performed to make business decisions to use the information, for example, to identify places in social network that merit focus, to campaign in a certain way, etc.

With reference again to FIG. 4, the present invention exemplarily can populate a mathematical decision-making model based on the attributes (e.g., see 430)(e.g., to perform social network analysis).

The present invention can determine attributes of the nodes and linkages from a plurality of disparate, heterogeneous data sources at another point in time (e.g., a second point in time after the first determination of attributes is made)(e.g., see 440). The mathematical decision-making model can then be re-populated based on the second set of attributes (e.g., see 450)(e.g., SNA can be re-performed). This process of determining attributes at different points in time and re-populating the decision-making model can be repeated, as exemplarily illustrated in FIG. 4 (e.g., SNA can be repeated).

Figure 5:
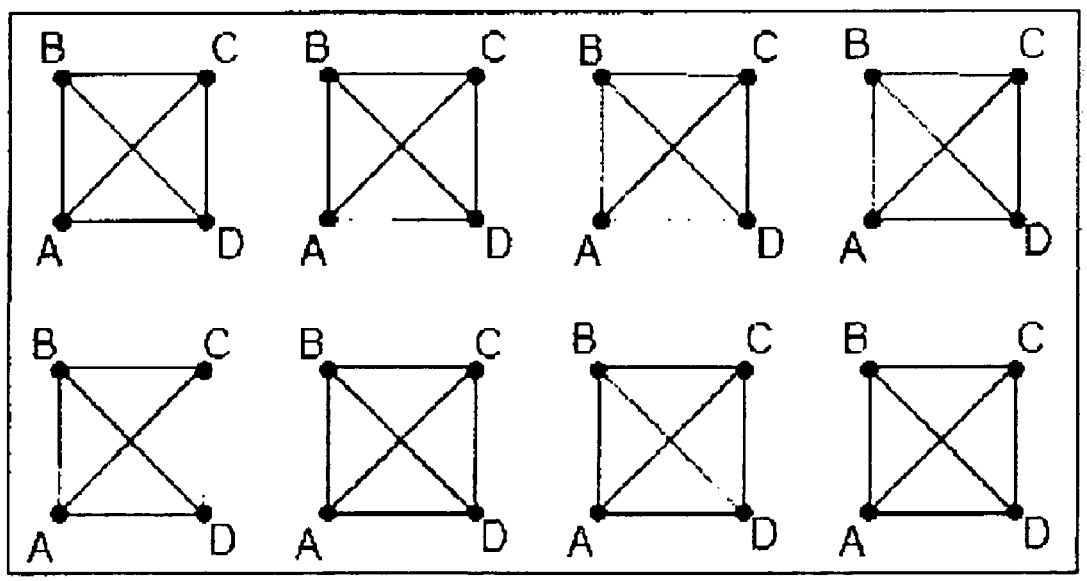
FIG. 5 graphically illustrates an exemplary system 500 according to an exemplary aspect of the invention.

FIG. 5 exemplary illustrates a system for solving crime using social network optimization, according to an exemplary aspect of the invention.

Figure 6:
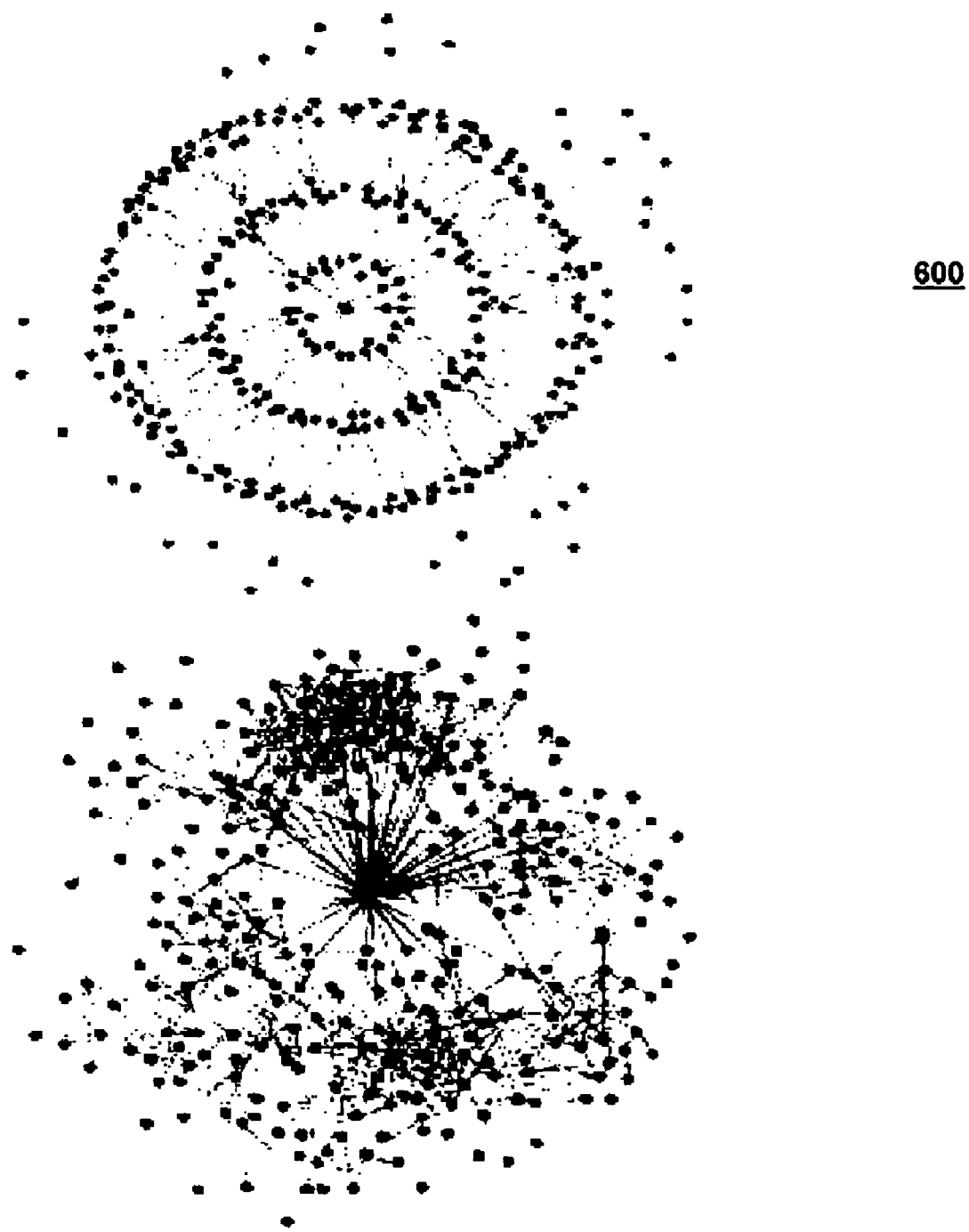
FIG. 6 graphically illustrates an exemplary system 600 according to an exemplary aspect of the invention.

FIG. 6 exemplary illustrates a system for identification of communication patterns within a terrorist network (Mar. 12, 2006, NY Times Magazine).

Figure 7:
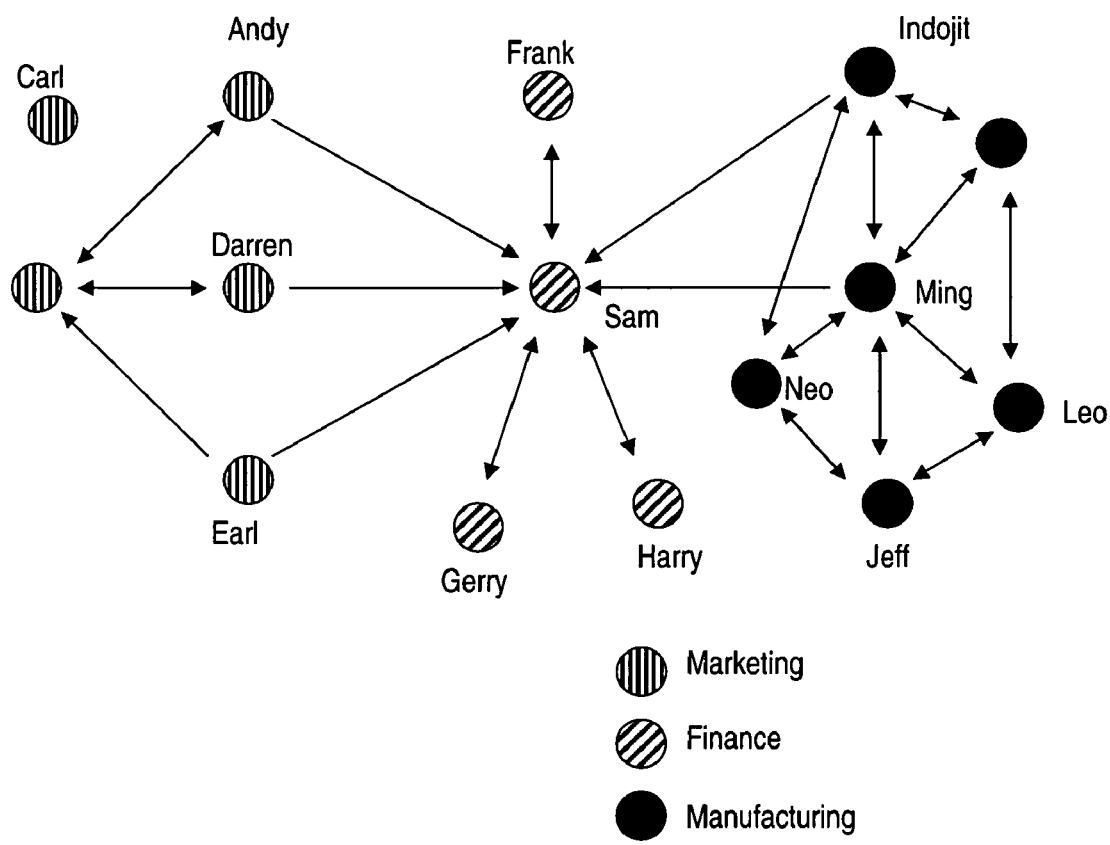
FIG. 7 graphically illustrates an exemplary system 700 according to an exemplary aspect of the invention.

FIG. 7 exemplarily illustrates analyzing and diagnosing collaboration barriers and risks in organizational networks, using social network optimization according to an exemplary aspect of the present invention.

Another exemplary aspect of the invention relates to a system for constructing a social network, including means for identifying a plurality of nodes and linkages of the social network, and means for determining attributes of the nodes and linkages based on a plurality of disparate, heterogeneous data sources.

While the invention is exemplarily described with respect to these exemplary services, those skilled in the art will recognize that the invention is not limited to the exemplary embodiments.

Figures 8, 9:
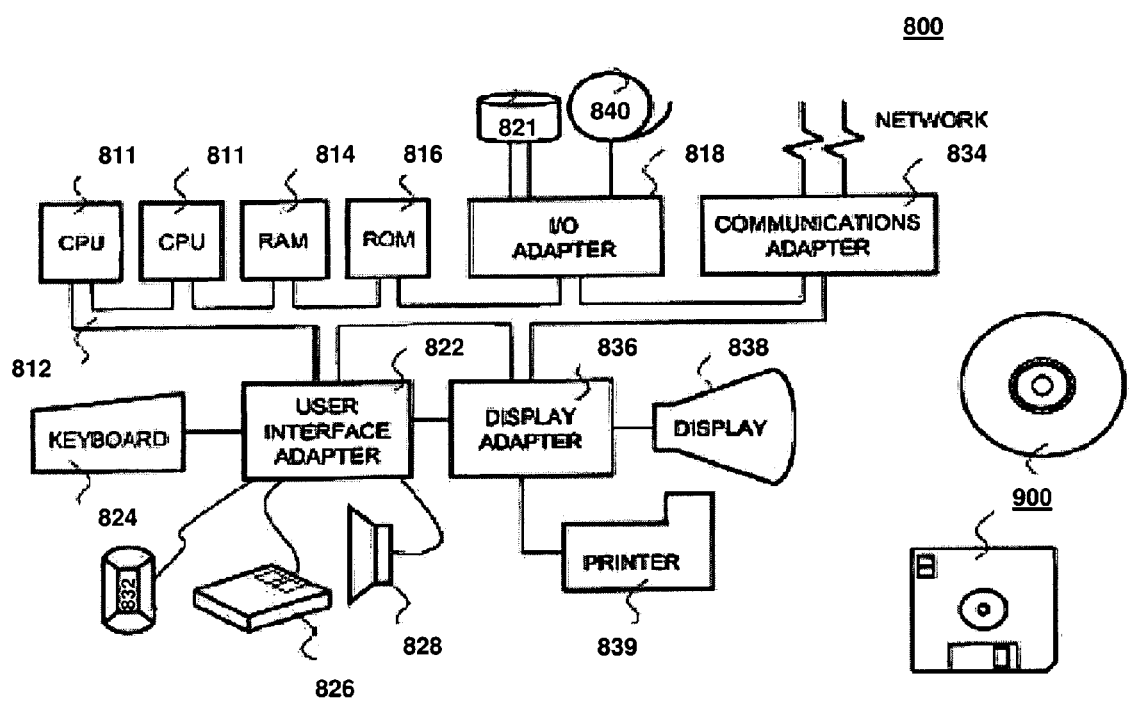
FIG. 8 illustrates an exemplary hardware/information handling system 800 for incorporating the present invention therein.
FIG. 9 illustrates a signal bearing medium (e.g., storage medium 900) for storing/recording steps of a program of a method according to the present invention.

FIG. 8 illustrates an exemplary hardware/information handling system 800 for incorporating the present invention therein, and FIG. 9 illustrates a signal bearing medium 900 (e.g., storage medium) for storing steps of a program of a method according to the present invention.

FIG. 8 illustrates a typical hardware configuration of an information handling/computer system for use with the invention and which preferably has at least one processor or central processing unit (CPU) 811.

The CPUs 811 are interconnected via a system bus 812 to a random access memory (RAM) 814, read-only memory (ROM) 816, input/output (I/O) adapter 818 (for connecting peripheral devices such as disk units 821 and tape drives 840 to the bus 812), user interface adapter 822 (for connecting a keyboard 824, mouse 826, speaker 828, microphone 832, and/or other user interface device to the bus 812), a communication adapter 834 for connecting an information handling system to a data processing network, the Internet, an Intranet, a personal area network (PAN), etc., and a display adapter 836 for connecting the bus 812 to a display device 838 and/or printer 839.

In addition to the hardware/software environment described above, a different aspect of the invention includes a computer-implemented method for performing the above method. As an example, this method may be implemented in the particular environment discussed above.

Such a method may be implemented, for example, by operating a computer, as embodied by a digital data processing apparatus, to execute a sequence of machine-readable instructions. These instructions may reside in various types of signal-bearing media.

This signal-bearing media may include, for example, a RAM contained within the CPU 811, as represented by the fast-access storage for example. Alternatively, the instructions may be contained in another signal-bearing media, such as a data storage disk/diskette 900 (FIG. 9), directly or indirectly accessible by the CPU 811.

Whether contained in the disk/diskette 900, the computer/CPU 811, or elsewhere, the instructions may be stored on a variety of machine-readable data storage media, such as DASD storage (e.g., a conventional "hard drive" or a RAID array), magnetic tape, electronic read-only memory (e.g., ROM, EPROM, or EEPROM), an optical storage device (e.g. CD-ROM, WORM, DVD, digital optical tape, etc.), paper "punch" cards, or other suitable signal-bearing media including transmission media such as digital and analog and communication links and wireless. In an illustrative embodiment of the invention, the machine-readable instructions may comprise software object code, compiled from a language such as "C", etc.

While the invention has been described in terms of several exemplary embodiments, those skilled in the art will recognize that the invention can be practiced with modification within the spirit and scope of the appended claims. For example, the ordinarily skilled artisan would know and understand that the present invention can include other data sources, such as all media sources (e.g., video imagery, audio, etc.) which can be converted to digital format and data mined/interpreted.

Further, it is noted that, Applicants' intent is to encompass equivalents of all claim elements, even if amended later during prosecution.

What is claimed is:

1. A computer implemented method of constructing a social network, the method comprising:

constructing said social network from a plurality of disparate, heterogeneous data sources, wherein at least one of said plurality of disparate, heterogeneous data sources includes a user generated data source;

identifying a plurality of nodes and linkages;

determining attributes of said nodes and linkages based on said plurality of disparate, heterogeneous data sources, wherein said plurality of disparate, heterogeneous data sources includes a combination of said user generated data source and at least one non-user generated source, wherein said attributes comprise at least one of:
 a deterministic attribute, a probabilistic attribute, and a dynamic attribute;

populating a mathematical decision-making model based on the plurality of nodes and linkages, and the determined attributes of said plurality of nodes and linkages;

determining attributes of said nodes and linkages at a second point in time;

re-populating said mathematical decision-making model based on the plurality of nodes and linkages, and the determined attributes of said plurality of nodes and linkages at said second point in time;

wherein said user generated data source includes at least one survey data source;

analyzing and diagnosing collaboration barriers and risks between said plurality of nodes of said social network;

wherein said determining attributes of said nodes and linkages at a second point in time comprises:
 collecting data from said plurality of disparate, heterogeneous data sources, wherein said plurality of disparate, heterogeneous data sources further comprises:
 at least one of a survey data, a social computing data, and a combination thereof.

* * * * *